United States Patent

Servi

[11] Patent Number: 5,940,754
[45] Date of Patent: Aug. 17, 1999

[54] METHOD OF FAULT IDENTIFICATION FOR MULTIPLEXED DEVICES

[75] Inventor: Leslie D. Servi, Bedford, Mass.

[73] Assignee: GTE Laboratories Incorporated, Waltham, Mass.

[21] Appl. No.: 07/900,224

[22] Filed: Jun. 17, 1992

[51] Int. Cl.[6] .................................................... H04Q 7/34

[52] U.S. Cl. .................... 455/425; 455/67.1; 455/115; 455/226.1; 370/252

[58] Field of Search ........................... 455/67.1, 115, 455/226.1, 353, 423, 425; 379/1, 2, 10, 16, 26, 111, 112, 113, 133, 134, 139; 370/13, 14, 16, 252; 364/514

[56] References Cited

U.S. PATENT DOCUMENTS

| 4,710,929 | 12/1987 | Kelly et al. | 379/1 X |
| 5,233,642 | 8/1993 | Renton | 379/111 X |

Primary Examiner—Wellington Chin
Assistant Examiner—Philip J. Sobutka
Attorney, Agent, or Firm—Leonard Charles Suchyta; Floyd E. Anderson

[57] ABSTRACT

A method for remotely detecting at a ground station failed multiplexors and radio transceivers in an airborne telephone system is disclosed. Usage activity of the devices is predicted using a normalized gaussian distribution. A three prong test examines actual usage activity of the multiplexors and radio transceivers which is normalized and compared with that predicted utilizing a chi-square analysis with a specified confidence interval to detect abnormalities in the usage activity.

4 Claims, 1 Drawing Sheet

METHOD OF FAULT IDENTIFICATION FOR MULTIPLEXED DEVICES

FIELD OF THE INVENTION

The current invention relates generally to a method for detecting a failed device and more particularly to a method for detecting a failed transceiver by a remote station.

BACKGROUND OF THE INVENTION

In recent years with the maturity of wireless communication new applications for this technology have emerged. One such example is telephone services provided to commercial aircraft passengers while in flight. A phone system installed aboard an aircraft provides standard telephone services to passengers by transmitting to a ground station which connects to the conventional telephone network. Initially, only one or two phones were placed aboard selected aircraft, but as demand for the service increased, both additional phones and aircraft were included.

The system consists of multiple phone handsets which connect to any one of a number of multiplexors on board the aircraft. Each multiplexor is further connected to radio transceiver to communicate with a ground station, connected to the public swithed telephone network.

Clearly, these airborne phone systems require maintenance and repair like any electromechanical device to insure proper operation. Maintenance and repair are particularly important in the harsh environment in which these systems are installed. Commercial aircraft often make numerous take-offs and landings in a day and the phone systems installed on such aircraft must survive the stress of these take-offs and landings and continue to operate properly. Maintenance is further complicated in that aircraft are only available for programmed maintenance at certain times of the day, and are seldom "overnight" at the same location.

In the past, service technicians were dispatched to perform the maintenance of each radio equipped aircraft. However, forecasting whether a multiplexor or radio transceiver was faulty tended to be inaccurate and was time consuming. Accordingly, each aircraft had to be visited by technicians further complicating scheduling due to the limited availability of aircraft.

It is thus desirable to identify a suspected failed device and dispatch the service technician to repair it rather than examine all the equipment onboard all aircraft.

OBJECTS OF THE INVENTION

Accordingly, it is a primary object of the invention to obviate the above noted and other disadvantages of the prior art.

It is a further object of the invention to provide a novel method for detecting a failed component without physically examining the component.

It is a further object of the invention to identify a suspected failed transceiver by a station remote to the transceiver.

It is a yet further aspect of the invention to identify a suspected failed multiplexor device which services a plurality of transceivers.

It is a still further aspect of the invention to provide a less labor intensive means of identifying a failed component through a remote device.

SUMMARY OF THE INVENTION

The above and other objects and advantages are achieved in one aspect of this invention by a method for detecting a suspected faulty device in a system of devices from a remote station. The system is engineered such that the expected theoretical usage of each device is determined and known. The method includes the steps of accumulating usage data of each device at the remote station, and identifying as faulty a device which differs in actual usage from from that predicted by a specified margin. In another aspect of the invention, an airborne telephone system is disclosed which employs the method of remotely detecting a faulty device. The devices on board the aircraft communicate with either a ground station or satelite which processes usage data according to the method disclosed and is connected to the public switched telephone network. The method of detecting a failed device described herein is less time consuming, less labor intensive, and more reliable than the previously described procedures.

DETAILED DESCRIPTION OF THE PREFERRED EMBODIMENT

Figure 1:
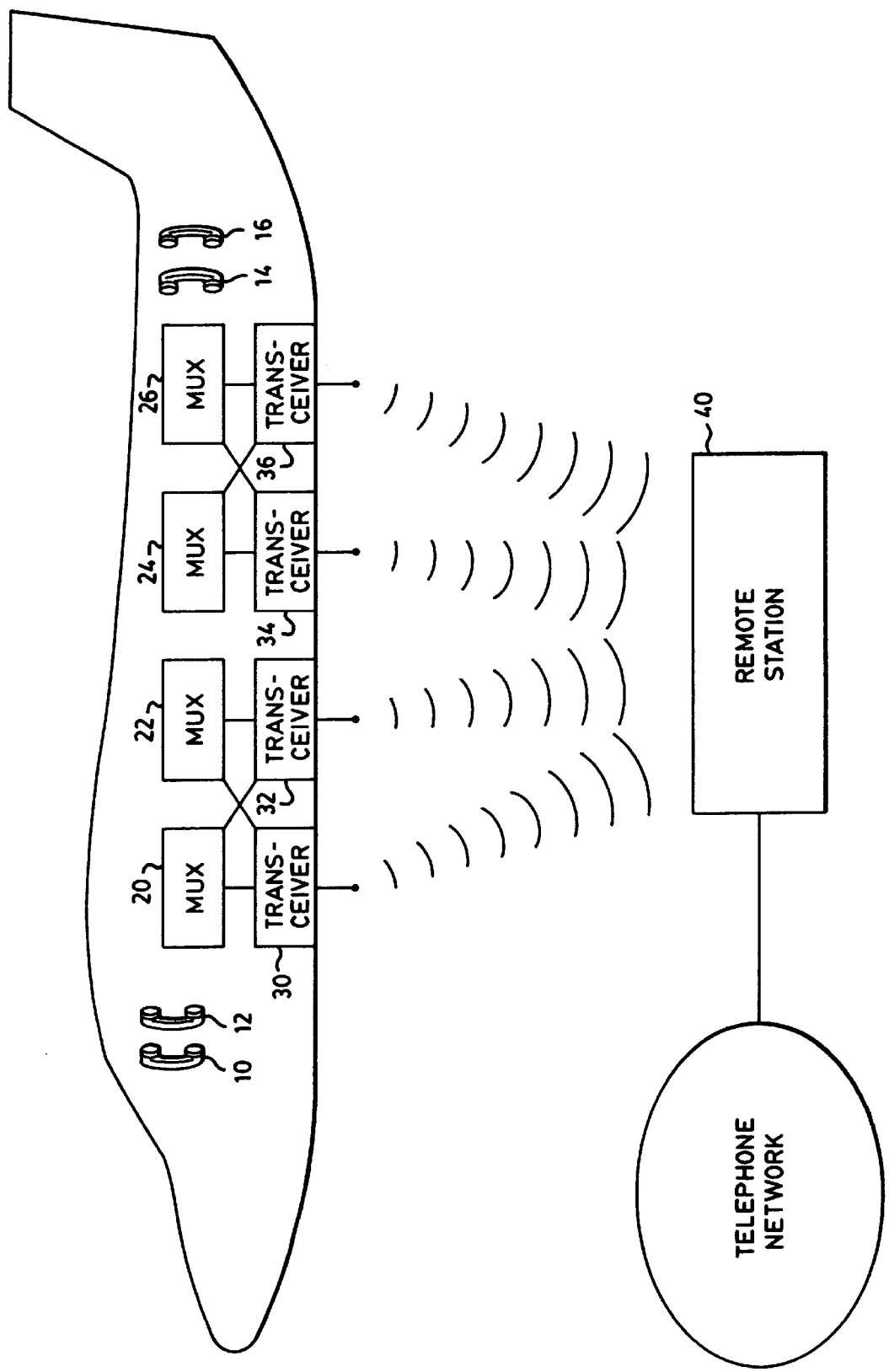
FIG. 1 is an illustration of one embodiment wherein the instant invention is employed.

For better understanding of the present invention together with and further objects, advantages and capabilities thereof, reference is made to the following disclosure in conjunction with the accompanying drawings. Referring now to FIG. 1 wherein is shown one embodiment of the present invention. A multiplicity of N phones or communicating devices 10, 12, 14, 16 are shown. Four communicating devices are depicted for exemplary purposes only. Each communicating device is capable of connecting to M multiplexors 20, 22, 24, and 26. Again, four multiplexors are depicted for exemplary purposes only. Each multiplexor 20, 22, 24 and 26 are coupled to one or more radio transceivers 30, 32, 34, and 36 for wireless communication to a remote station 40. As depicted in FIG. 1, a multiple radio transceivers 30 and 32 support one or more multiplexors 20 and 22. Remote station 40 is either a ground station or a satelite which is further connected to a public or private telephone network.

While in the diagram of FIG. 1 the communicating devices 10, 12, 14, and 16 are depicted as telephone handsets one of ordinary skill in the art will recognize that the scope of the invention is not so limited. Other communicating devices such as a transducer or facsimile machine are considered within the scope of this disclosure. The embodiment of the invention which is depicted in FIG. 1 depicts the installation of an airborne telephone system which is connected to the public switched telephone network by airborne multiplexors and radio transceivers. However, one of ordinary skill in the art will also recognize that the invention is not narrowly restricted to airborne telephone systems but rather applies to any system benefiting from remote detection of a failed device.

The connection of an individual communicating device 10, 12, 14, or 16 to a multiplexor 20, 22, 24, or 26 is engineered such that the choice of the multiplexor is random and thus theoretically the usage is uniformly spread among the multiplexors. Further, each multiplexor randomly assigns calls to the radio transceivers to which they are attached.

Further describing one embodiment of the instant invention implemented as an airborne telephone system, one desiring to place a phone call on board the aircraft utilizes a communicating device 10. Upon initiating the call, the communicating device 10 connects to one of the multiplexors 20, 22, 24 or 26 for multiplexing the signals received from the multiple communicating devices connected to it. The assignment of a transceiver and multiplexor is chosen in a random fashion and thus the usage will theoretically be uniform over all transceivers and multiplexors. Each multiplexor is fixedly connected to multiple radio transceivers providing for transmission to remote station 40. Each of the multiplexors 20, 22, 24, and 26 have associated with it a unique identification code. This identification code is transmitted by the radio transceiver 30 to the remote station 40 at the beginning of the call processing for communicating device 10. Remote station 40, having a processing capability, records and accumulates the number of calls for each multiplexor 20, 22, 24, or 26, and stores the accumulation as $x_{ij}$, where i identifies the radio transceiver and j the multiplexor.

In examining whether a multiplexor or radio transceiver is suspected faulty the accumulation of calls $x_{ij}$ are analyzed for the multiplexors 20, 22, 24, and 26 and radio transceivers 30, 32, 34, and 36. The choice of multiplexor 20, 22, 24, or 26 is random for a communicating device 10 making a call, and thus as previously described the call assigned to each multiplexor should be nearly uniform in the absence of a multiplexor or radio transceiver failure. A large variance among the other multiplexors or radio transceivers in the number of calls assigned to a multiplexor or radio transceiver indicates a suspected faulty multiplexor or radio transceiver or both.

In identifying a suspected failed radio transceiver or multiplexor the following steps are performed by remote station 40:

(a) receiving the unique identification code of a multiplexor and a radio transceiver at the inception of the call from a communicating device;

(b) accumulating a count, $x_{ij}$, of the number of calls for each multiplexor device j and radio transceiver i over the period of consideration usually one day's activity;

(c) selecting an aircraft to determine if the aircraft requires maintenance on its installed M multiplexors and/or N radio transceivers;

(d) calculating $X_i$ as follows $$X_i = \sum_{j=1}^{M} x_{ij}$$

for determining the number of calls for each radio transceiver i;

(e) calculating A as follows for each aircraft $$A = \sum_{i=1}^{N} X_i / M$$

for determining the average number of calls for the radio transceivers on board the aircraft;

(f) calculating a value D $$D = \sum_{i=1}^{N} (X_i - A)^2 / A$$

for the N radio transceivers on a single aircraft;

(g) specifying a first tolerance metric $\delta_1$;

(h) stopping further examination of the selected aircraft if $D < \delta_1$;

(i) calculating $Y_j$ for each multiplexor j as follows $$Y_j = \sum_{i=1}^{M_j} x_{ij} / M_j$$

where $M_j$ is the number of radio transceivers to which multiplexor j is connected;

(j) specifying a second tolerance metric $\delta_2$;

(k) calculating for each multiplexor j $$S_j = \sum_{i=1}^{N} (x_{ij} - Y_j)^2 / Y_j$$

(l) stopping further examination of the selected aircraft if $S_j < \delta_2$ for all j;

(m) specifying a third tolerance metric $\delta_3$;

(n) calculating $x_i - A$ for each radio transceiver i;

(o) dispatching a service technician to the selected aircraft if $x_i - A > \delta_3$ for some i.

The method described above allows remote station 40 to forecast if either a multiplexor or a transceiver is faulty without incurring the cost of examining each transceiver and multiplexor. Although the method described above tests for both transceiver and mutiplexor failure, it will be clearly recognized by one of ordinary skill in the art that the two tests may be made independently or as described above in conjunction. Further, while in the above method a service technician is only dispatched if the aircraft fails all the tests, one will recognize that the method can be modified to dispatch a service technician if any of the tests are failed. In one embodiment of the invention, a gaussian distribution is assumed and a chi-square analysis is utilized to determine the metrics, $\delta_1$ $\delta_2$ and $\delta_3$, within a desired confidence. However, one skilled in the art will recognize that other distributions and confidence tests can be utilized to specify the metrics.

While there has been shown and described what is at present considered the preferred embodiment of the invention it will be obvious to those skilled in the art that various changes and modifications may be made therein without departing from the invention as defined by the appended claims.

What is claimed is:

1. A method for dispatching at a remote station a service technician to repair a communication system for making telephone calls having M multiplexors and N radio transceivers, the method comprising the steps of;

(a) receiving a signal at said remote station having the identification code of a multiplexor and a radio transceiver at the inception of a call;

(b) accumulating a count, $x_{ij}$, of the number of calls for each multiplexor device j and radio transceiver i over a period of consideration;

(c) selecting an individual communication system to determine if the communication system requires maintenance on its installed M multiplexor and/or N radio transceivers;

(d) calculating $X_i$ as follows $$X_i = \sum_{j=1}^{M} x_{ij}$$

for determining the number of calls for each radio transceiver i;

(a) calculating A as follows for each aircraft $$A = \sum_{i=1}^{N} X_i / M$$

for determining the average number of calls for the radio transceivers on board the aircraft;

(f) calculating a value D $$D = \sum_{i=1}^{N} (X_i - A)^2 / A$$

for the N radio transceivers of the communication system;

(g) specifying a first measurement tolerance $\delta_1$ for projected usage of the said communication system;

(h) stopping further examination of the selected communication system if $D<\delta_1$;

$$Y_j = \sum_{i=1}^{M_j} x_{ij} / M_j$$

where $M_j$ is the number of radio transceivers to which multiplexor j is connected;

(j) specifying a second measurement tolerance $\delta_2$ for projected usage of the said communication system;

(k) calculating for each multiplexor j $$S_j = \sum_{i=1}^{N} (x_{ij} - Y_j)^2 / Y_j$$

(l) stopping further examination of the selected communication system if $S_j<\delta_2$ for all j;

(m) specifying a third measurement tolerance $\delta_3$ for projected usage of the said communication system;

(n) calculating $x_i - A$ for each radio transceiver i;

(o) dispatching a service technician to the selected communication system if $x_i - A > \delta_3$ for some i.

2. The method of claim 1 wherein the remote station is a ground station.

3. The method of claim 2 wherein the remote station is a satelite station.

4. The method of claim 2 wherein the communication system is housed on board an aircraft.

\* \* \* \* \*

UNITED STATES PATENT AND TRADEMARK OFFICE
CERTIFICATE OF CORRECTION

PATENT NO : 5,940,754
DATED : August 17, 1999
INVENTOR(S) : Leslie D. Servi

It is certified that error appears in the above-identified patent and that said Letters Patent is hereby corrected as shown below:

Col. 4, line 66
  replace "multiplexor"
  with --multiplexors--.

Col. 6, line 1
  replace "BLANK SPACE BENEATH COLUMN HEADING 6 "
  with --"(i) calculating Yj for each multiplexor j as follows"--.

Signed and Sealed this

Ninth Day of January, 2001

*Attest:*

Q. TODD DICKINSON

*Attesting Officer*     *Commissioner of Patents and Trademarks*